US009495749B2

(12) United States Patent
Tanaka et al.

(10) Patent No.: US 9,495,749 B2
(45) Date of Patent: Nov. 15, 2016

(54) METHOD AND SYSTEM FOR DETECTING POSE OF MARKER

(71) Applicant: National Institute of Advanced Industrial Science and Technology, Chiyoda-ku, Tokyo (JP)

(72) Inventors: Hideyuki Tanaka, Tsukuba (JP); Yasushi Sumi, Tsukuba (JP); Yoshio Matsumoto, Tsukuba (JP)

(73) Assignee: NATIONAL INSTITUTE OF ADVANCED INDUSTRIAL SCIENCE AND TECHNOLOGY, Tokyo (JP)

( * ) Notice: Subject to any disclaimer, the term of this patent is extended or adjusted under 35 U.S.C. 154(b) by 628 days.

(21) Appl. No.: 13/918,605

(22) Filed: Jun. 14, 2013

(65) Prior Publication Data
US 2014/0111639 A1 Apr. 24, 2014

(30) Foreign Application Priority Data
Oct. 24, 2012 (JP) ................................. 2012-234896
May 15, 2013 (JP) ................................. 2013-103149

(51) Int. Cl.
*H04N 5/262* (2006.01)
*G06K 9/32* (2006.01)
*G06T 7/00* (2006.01)

(52) U.S. Cl.
CPC ........... *G06T 7/0044* (2013.01); *G06K 9/3216* (2013.01); *G06K 2009/3225* (2013.01); *G06T 2207/30204* (2013.01)

(58) Field of Classification Search
CPC ... G06T 7/004; G06T 7/0042; G06T 7/0044; G06T 7/0046; G06T 7/0051; G06T 7/0057; G06T 7/0081

USPC ......................................................... 348/135
See application file for complete search history.

(56) References Cited

U.S. PATENT DOCUMENTS

| 2003/0046821 | A1* | 3/2003 | Horie | G03F 7/70616 33/297 |
| 2003/0202709 | A1* | 10/2003 | Simard | G06K 9/00442 382/243 |
| 2004/0200261 | A1* | 10/2004 | Shuman | B82Y 35/00 73/1.79 |
| 2007/0243863 | A1* | 10/2007 | Hong | G02B 27/017 455/418 |

(Continued)

OTHER PUBLICATIONS

Kyriakoulis et al., Color-Based Monocular Visuointertial 3-D Pose Estimation of a Volant Robot, Oct. 2010, IEEE Transactions on intrumentation and mreasurement. vol. 59, pp. 2706-2715.*

(Continued)

*Primary Examiner* — Mohammed Rahaman
*Assistant Examiner* — Jimmy S Lee
(74) *Attorney, Agent, or Firm* — Seed IP Law Group LLP

(57) ABSTRACT

A pose detecting system includes: a marker using a microlens array; a camera; and a computer receiving a marker image. The marker includes: a lens area constituted of the microlens array and a mark array having a plurality of marks arrayed with a pitch similar to that between a plurality of lenses constituting the microlens array so as to produce a moiré pattern; and four reference points. The computer performs: determining the pose of the marker based on the four reference points; analyzing the moiré pattern so as to calculate an angle formed by the marker and a straight line connecting the center of an integrated mark that emerges at the lens area as the moiré pattern and is similar in shape to each of the plurality of marks to a viewpoint at the marker; and correcting the pose of the marker by using the angle.

11 Claims, 23 Drawing Sheets

(56) References Cited

U.S. PATENT DOCUMENTS

2011/0262014 A1* 10/2011 Kuo .................. A61B 5/1032
                                              382/128
2014/0177008 A1*  6/2014 Raymond ............ B42D 25/324
                                              358/3.28

OTHER PUBLICATIONS

Y.Uematsu and H.Saito, "Improvement of Accuracy for 2D Marker-Based Tracking Using Particle Filter", in Proc. 17th Intl. Conf. Artificial Reality and Telexistence 2007, pp. 183-189, 2007.

M. G. Lippmann: "Epreuves reversibles donnant lasensation du relief," J. Phys. (Paris) 7, 821-825 (1908) (+English Translation), 8 pages.

"ARToolKit", retrieved on Oct. 23, 2012, from http://www.hitl.washington.edu/artoolkit/, 2 pages.

"Grapac Japan", "3D Printing Materials printing/processing", retrieved on Oct. 23, 2012, from http://www.grapac.co.jp/print/print.html, 2 pages.

F.Dunn and I.Parberry, "3D Math Primer for Graphics and Game Development, 2nd Edition", A K Peters/CRC Press, 2011, 46 pages.

* cited by examiner

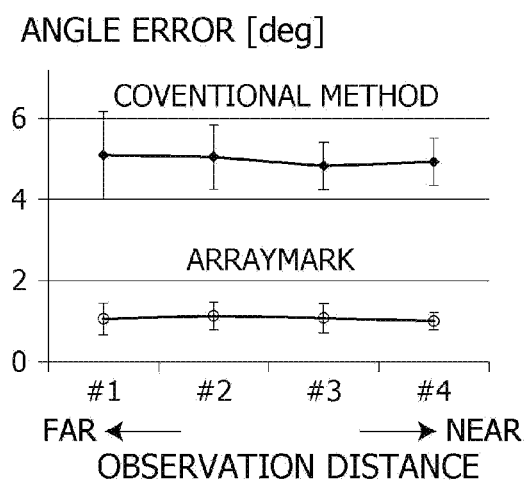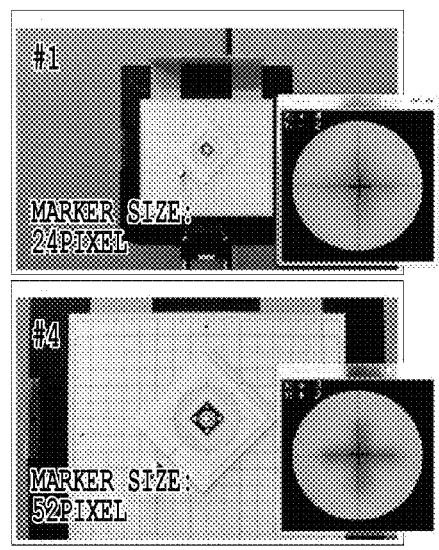
FIG.16

METHOD AND SYSTEM FOR DETECTING POSE OF MARKER

CROSS-REFERENCE TO RELATED APPLICATIONS

This application claims the benefit of Japanese Patent Application Nos. 2012-234896 filed Oct. 24, 2012 and 2013-103149 filed May 15, 2013 which are hereby incorporated by reference herein in their entirety.

BACKGROUND OF THE INVENTION

1. Field of the Invention

The present invention relates to a pose detecting system using a marker that can be attached to an object.

2. Description of the Related Art

An AR (abbreviating "Augmented Reality") marker is a useful tool for readily realizing "Augmented Reality" in cooperation with an inexpensive camera. A plurality of kinds of AR markers including ARToolKit have existed. Many planar visual markers in the prior art calculate the pose of a marker by three-dimensional geometry based on the principle of projective conversion. For example, four points (such as four corners of a marker) whose positional relationship has been already known are extracted, and then, a relative pose between a camera and a marker is uniquely determined based on the positions of the four points on an image (hereinafter referred to as "the marker pose detecting technique in the related art", "the conventional technique", and the like).

SUMMARY OF THE INVENTION

However, in the above-described system in the related art, the deviation of the detected point on the image adversely affects pose estimation accuracy. When, in particular, the marker and an observing object (an observer) of the marker face each other, that is, the plane of the marker is substantially vertically positioned with respect to the visual line of the observer, an apparent angular change becomes larger than that when the visual line is inclined, thereby degrading the estimation accuracy of the pose of the mark (Y. Uematsu and H. Saito, "Improvement of Accuracy for 2D Marker-Based Tracking Using Particle Filter", *Proc. 17th Intl. Conf. Artificial Reality and Telexistence* 2007, pp. 183-189, 2007). The property of "degradation of the pose estimation accuracy when the marker is observed near the front of the marker" is common to the AR markers in the prior art, and therefore, it is a problem that is hardly solved in principle. Although a filter technique may stabilize an estimation value, it is difficult to secure "the accuracy" of the estimation value.

In order to solve the problem to be solved, according to one aspect of the present invention, the problem to be solved is solved by introducing a new measurement principle. An AR marker for use in a pose detecting system according to one aspect of the present invention has a moiré pattern (i.e., an interference pattern) produced by a microlens array. Since the moiré pattern is changed according to an angle, at which the marker is observed, information on the angle of a visual line with respect to the marker can be extracted by analyzing the moiré pattern by image processing. Even when the marker is observed near the front thereof, the pose can be stably estimated with accuracy, with which the conventional AR marker can be hardly estimated, by using the new AR marker proposed according to one aspect of the present invention.

According to one aspect of the present invention, the pose of the marker can be stably estimated with high accuracy even when the marker is observed near the front thereof.

Further features of the present invention will become apparent from the following description of exemplary embodiments (with reference to the attached drawings).

BRIEF DESCRIPTION OF THE DRAWINGS

FIGS. 15 to 17 are diagrams illustrating the comparison of performance between the pose detecting method in the preferred embodiment according to the present invention and a pose detecting method in the prior art;

DESCRIPTION OF THE EMBODIMENTS

A description will be given below of a preferred embodiment according to the present invention.

[High-Accuracy AR Marker Using Microlens Array]

(Design of ArrayMark)

Figure 1:
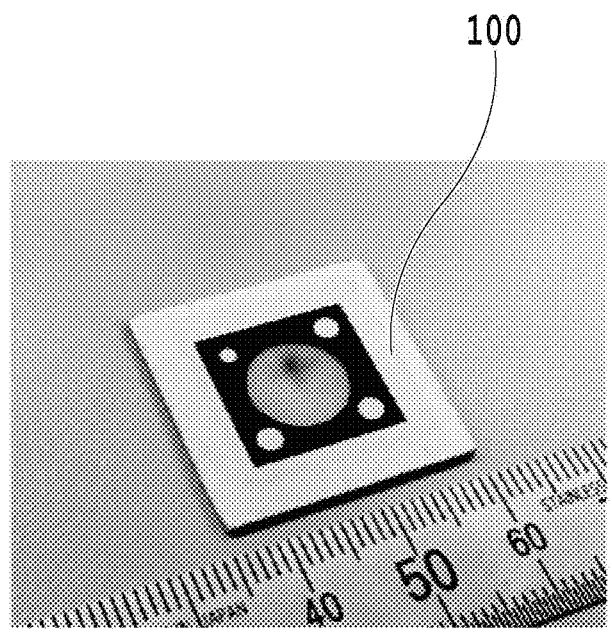
FIG. 1 is a view illustrating one example of a prototype of an ArrayMark serving as an AR marker for use in a pose detecting system in a preferred embodiment according to the present invention.
Figure 2:
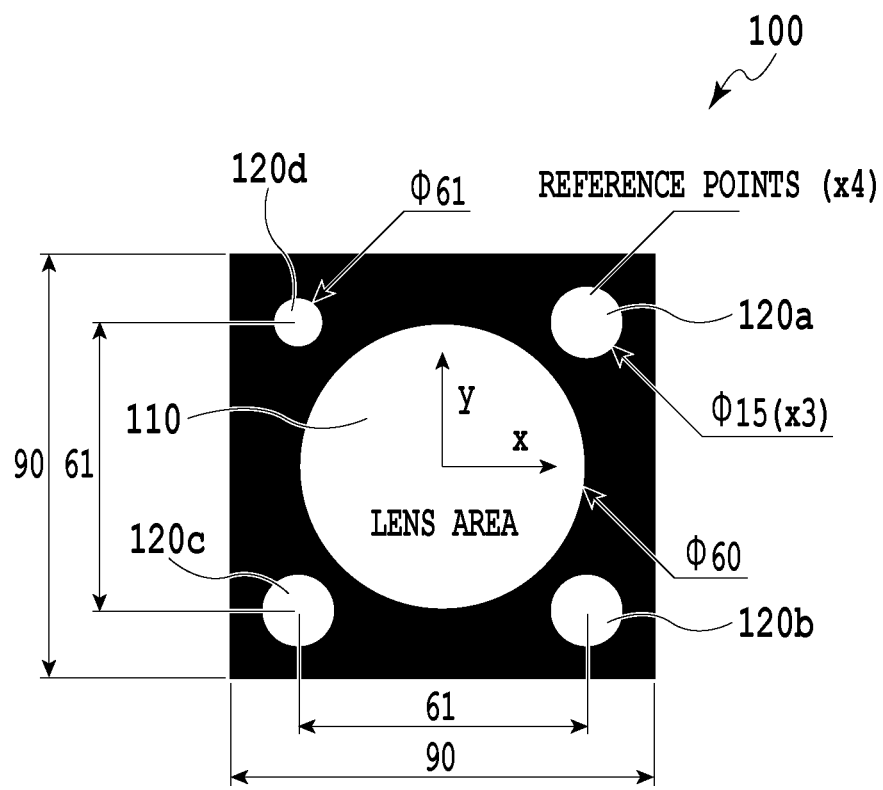
FIG. 2 is a diagram illustrating one example of a design of the ArrayMark in the preferred embodiment according to the present invention.

FIG. 1 illustrates one example of an ArrayMark serving as an AR marker for use in a pose detecting system in the present preferred embodiment. An ArrayMark 100 shown in FIG. 1 is a plate-like square marker. One side of the square of a frame of the ArrayMark 100 is 15 mm in length. FIG. 2 illustrates one example of the design of an ArrayMark. The ArrayMark illustrated in FIG. 2 has four reference points 120a, 120b, 120c, and 120d which are used for image transformation and initial pose estimation. One of the four reference points (the reference point 120d in the present preferred embodiment) is smaller than the other three reference points (the reference points 120a, 120b, and 120c in the present preferred embodiment) in order to identify the orientation of the marker 100. The marker 100 has, at its center, a circular lens area 110 in which a two-dimensional moiré pattern is displayed. An ID for identifying a marker can be achieved by attaching some sort of pattern beside the ArrayMark 100, for example.

(Structure of Lens Area)

Figure 3:
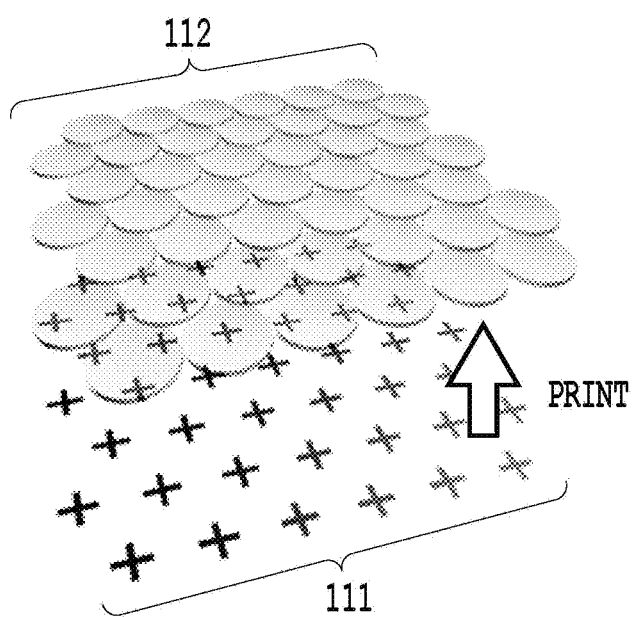
FIG. 3 is a diagram illustrating one example of a structure of a lens area in the ArrayMark in the preferred embodiment according to the present invention.
Figure 4:
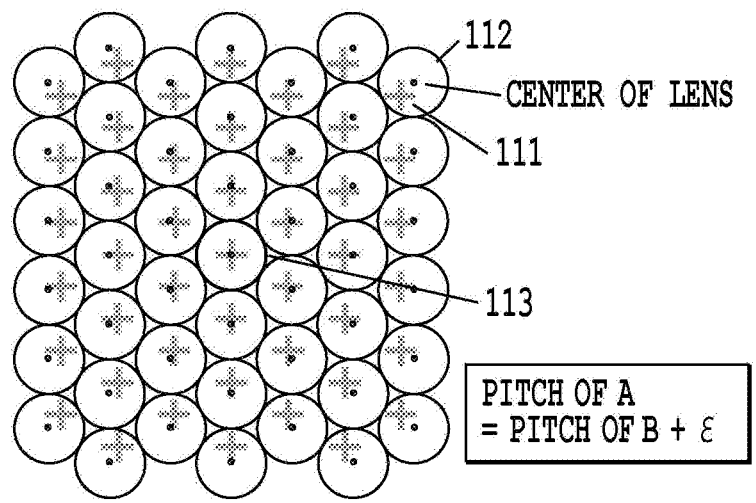
FIG. 4 is a diagram illustrating one example of a positional relationship between a microlens and a plus sign in the ArrayMark in the preferred embodiment according to the present invention.

FIG. 3 illustrates the structure of the lens area 110. Many plus signs 111 are printed on the reverse of a microlens array 112. FIG. 4 is a diagram illustrating a positional relationship between lenses constituting the microlens array 112 and the plus signs 111. Although the array of the plus signs 111 may be similar to the microlens array 112, a pitch between the plus signs 111 is slightly smaller than that between the lenses of the microlens array 112 as one example in the ArrayMark in the present preferred embodiment. In contrast, in the case where the pitch between the lenses of the microlens array 112 is smaller than that between the plus signs 111, plus marks, described later, appearing at the lens area 110 are moved reversely. However, this is not an essential matter. In other words, the pitch between the plus signs 111 may be slightly greater than that between the lenses of the microlens array 112.

The plus sign at the ArrayMark illustrated in FIG. 3 and the like is merely one example, and therefore, is not limited to this. For example, the plus sign may be replaced with a circular mark or a dot mark.

Figure 5:
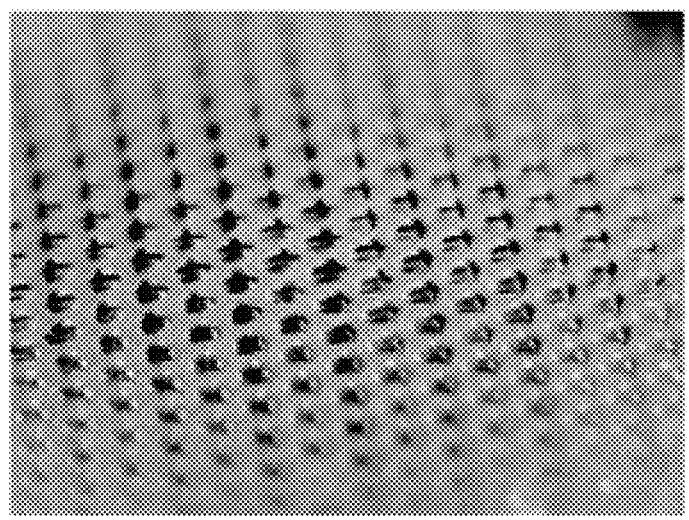
FIG. 5 is a microscope photograph illustrating the lens area in the ArrayMark in the preferred embodiment according to the present invention.

In the ArrayMark 100 in the present preferred embodiment, the lens which has a plus sign printed exactly at the center thereof (right under the lens) is referred to as a center lens 113. A phase difference between the lens of the microlens array 112 and the plus sign 111 becomes greater as a distance from the center lens 113 becomes longer. FIG. 5 illustrates one example of a microscopic image of the lens area.

(Behavior of ArrayMark and Its Principle)

Figure 6:
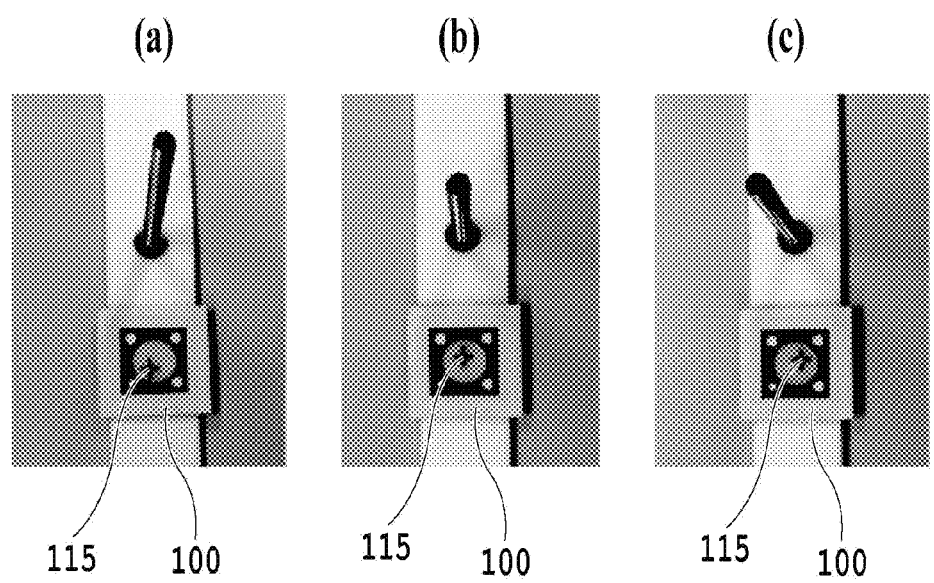
FIG. 6 is a view illustrating apparent behaviors of a plus mark according to visual-line angles in the ArrayMark in the preferred embodiment according to the present invention.
Figure 7:
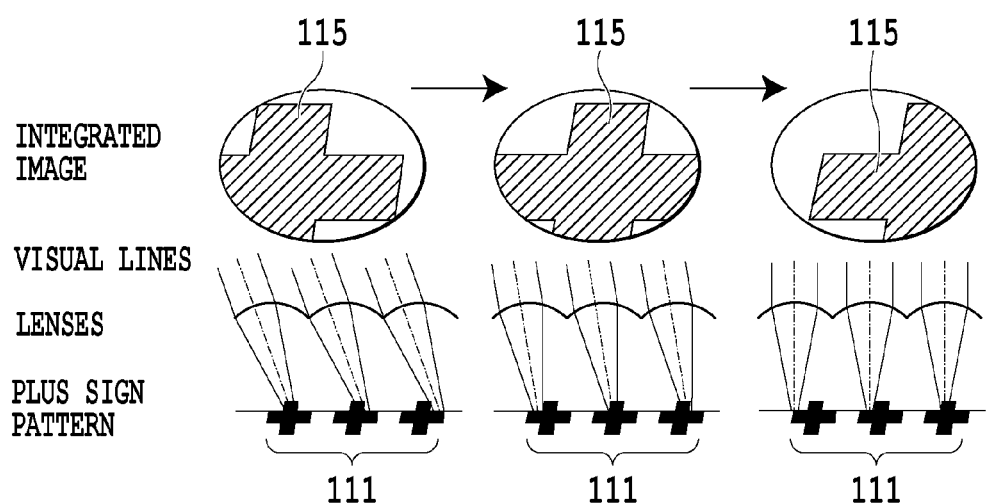
FIG. 7 is a diagram schematically illustrating the principle of pattern changes in the ArrayMark in the preferred embodiment according to the present invention.

First, explanation will be made on the behavior of the ArrayMark in the present preferred embodiment. FIG. 6 shows the apparent behavior of a plus mark 115 appearing at the lens area 110 according to a visual-line angle. FIG. 7 is a schematic diagram illustrating the principle of a pattern change. Each of the lenses constituting the microlens array 112 magnifies a different part of the (small) plus sign 111 corresponding to each of the lenses. Here, a large plus mark 115 appearing at the lens area 110 of the marker 100 is an image produced by integrating portions of the plus signs magnified by the lenses constituting the microlens array 112. The image is produced by a two-dimensional moiré effect which is an extension of a one-dimensional moiré effect. The above-described mechanism is the same as that of an integral-imaging technique (e.g., M. G. Lippmann, "Epreuves reversibles donnant la sensation du relief", *J. Phys.*, 7, 821-825, Paris, 1908) which is utilized in three-dimensional displaying. In the pose detecting system in the present preferred embodiment, this mechanism is used to obtain the visual-line angle.

[Pose Estimation Algorithm]

Figure 8:
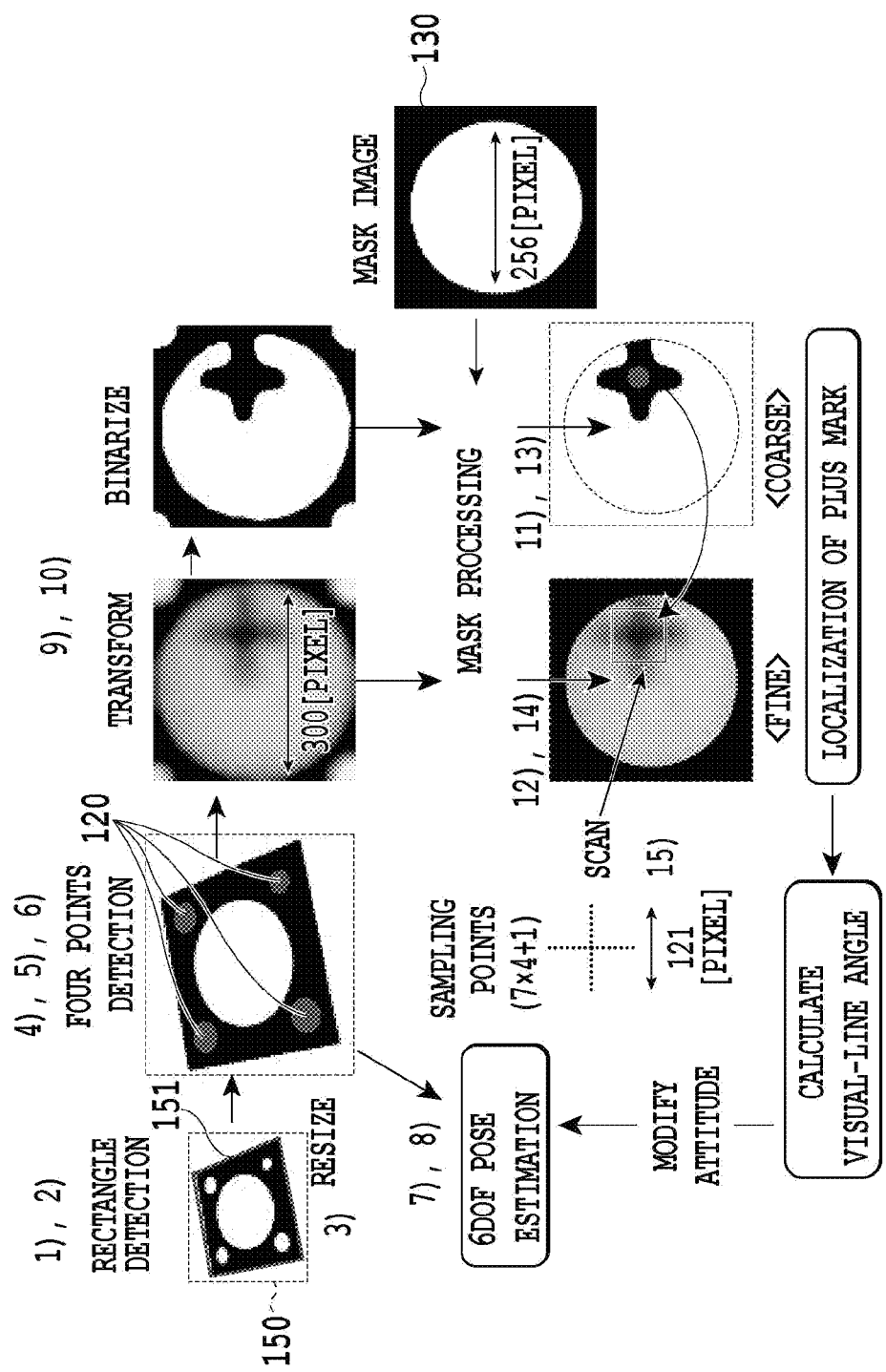
FIG. 8 is a diagram illustrating processing procedures of pose estimation in the pose detecting system in the preferred embodiment according to the present invention.

In the pose detecting system in the present preferred embodiment, the pose of the ArrayMark is estimated according to the following procedures (see FIG. 8).

A) Calculating a six-DOF pose using the four reference points 120a, 120b, 120c, and 120d;
B) detecting the position of the plus mark 115;
C) calculating the visual-line angle; and
D) modifying a three-DOF attitude using information on the visual-line angle.

The steps B) to D) are executed for obtaining the pose of the ArrayMark with higher accuracy when the ArrayMark is observed near the front.

Each of the steps A) to D) will be described below.

(A. Calculating Six-DOF Pose Using Four Reference Points)

This step is executed by the following procedures:

1) with respect to a marker image 150 including the marker 100, picked up by a camera 200, detecting a rectangular region corresponding to the image of the marker 100 by contour detection;
2) setting a rectangular region 151 surrounding the region detected in the step 1);
3) resizing the rectangular region 151 set in the step 2) to a predetermined size;
4) binarizing the image (i.e., the rectangular region) resized in the step 3) so as to segment it into connected regions;
5) detecting the four reference points 120 on the image through filtering with an area, a width, and an aspect ratio;
6) labeling the detected four reference points 120 by the use of the positional interrelationship thereamong;
7) calculating the position of each of the reference points on an original image; and
8) calculating a homogeneous transformation matrix from an image plane to the marker 100 in a real space by using the positions of the four reference points calculated in the step 7)

(B. Detecting Plus Mark)

9) Calculating a projective transformation such that the four reference points 120 labeled in the step 6) are located at the four corners;
10) transforming the image resized in the step 3) into an undistorted image as the marker 100 is viewed in the front by the transformation in the step 9), wherein the image has a size of 300 pixels×300 pixels;

11) binarizing the image subjected to the processing in the step 10), followed by masking it with an image mask 130 illustrated in FIG. 8, and then, pasting the masked image to a white image;

12) masking the image subjected to the processing in the step 10) with the image mask 130 illustrated in FIG. 8, and then, pasting the masked image to a black image;

13) segmenting the image subjected to the processing in the step 11) into connected regions, and then, detecting a region having the largest black portion and its gravity, wherein the detected gravity is located at a coarse position of the plus mark 115;

14) setting a search region having a size of 64 pixels×64 pixels around the coarse position of the plus mark 115 on the image subjected to the processing in the step 12); and 15) scanning a set of sampling points (a cross shape) illustrated in FIG. 8 on the image subjected to the processing in the step 12) so as to obtain a gray value, wherein the set of the sampling points is scanned such that the center of the set of the sampling points falls within the search region set in the step 14), and further, a brightness $v_d$ is calculated by the following equation:

$v_d$=sum of gray values at effective sampling points/ number of effective sampling points Here, "effective" means that a sampling point lies within the lens area 110. Consequently, the position of the cross-shaped sampling point which scored the lowest brightness $v_d$ is referred to as the fine position of the plus mark 115.

The gray value of the monochromatic image may be replaced with a gray value or the like in consideration of a specified color. For example, in the case where the plus mark is red, the measurement value of the sampling point is set to R among the three primary colors RGB, and then, the plus mark may be located at a position where the sum of the measurement values is maximum.

Moreover, in the case where a mark other than the plus mark emerges as a two-dimensional moiré pattern of a marker, the shape of the above-described set of sampling points may conform to the mark.

(C. Calculating Visual-Line Angle)

Figure 9:
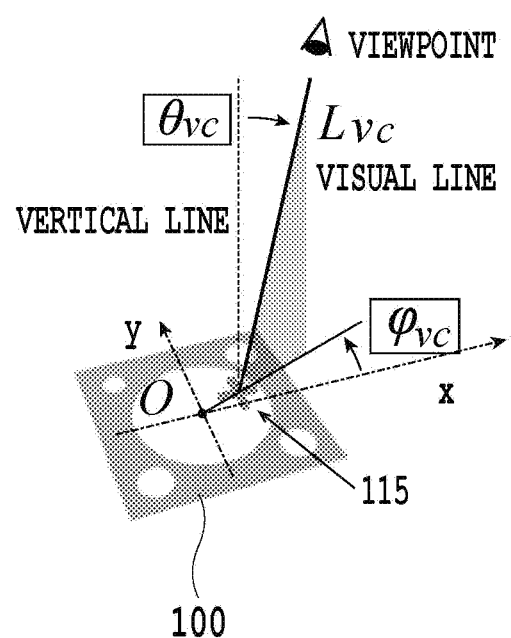
FIG. 9 is a diagram illustrating the definition of a "visual-line angle" in the present specification.

In the present specification, a "visual line" is defined as a straight line connecting the center of the plus mark 115 to a viewpoint (FIG. 9). Furthermore, visual-line angles $\theta_{vc}$ and $\phi_{vc}$ are defined as illustrated in FIG. 9, wherein $\theta_{vc}$ represents "Π/2—elevation angle" and $\phi_{vc}$ represents an "azimuth angle". Specifically, the "visual-line angle" may be an angle formed between the marker 100 and a straight visual line connecting the center of a mark (i.e., the plus mark 115) emerging at the lens area 110 as the moiré pattern and having a shape similar to those of a plurality of marks (i.e., the plus signs 111) to the viewpoint of the marker 100 (e.g., a position where the camera 200 picks up an image). Additionally, a set $(\theta_{vc}, \phi_{vc})$ corresponds to the position $(x_c, y_c)$ of the plus mark 115 in a one-to-one fashion based on the positional relationship between the lenses of the microlens 112 and the plus pattern 111 illustrated in FIG. 4.

Figure 10:
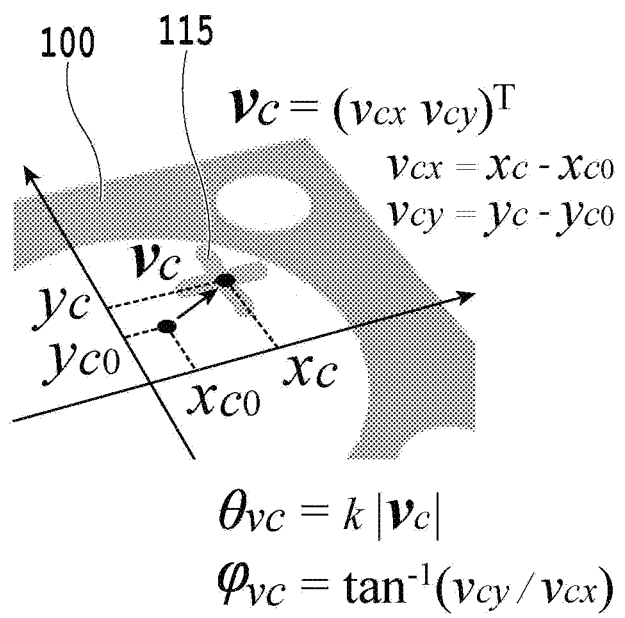
FIG. 10 is a diagram explanatory of a method for calculating the visual-line angle at the position of the plus mark in a pose detecting method in the preferred embodiment according to the present invention.

In the present preferred embodiment, the relationships between the position $(x_c, y_c)$ of the plus mark 115 and the visual-line angles $\theta_{vc}$ and $\phi_{vc}$ are expressed by the following equations (1) to (5) (FIG. 10).

$$\text{Center lens position} = (x_{c0}, y_{c0}) \quad (1)$$

$$\text{Plus mark position} = (x_c, y_c) \quad (2)$$

$$v_c = (v_{cx}\ v_{cy})^T$$
$$= (x_c - x_{c0}\ y_c - y_{c0})^T \quad (3)$$

$$\theta_{vc} = k\|v_c\| \quad (4)$$

$$\varphi_{vc} = \tan^{-1}(v_{cy}/v_{cx}) \quad (5)$$

Incidentally, k is a predetermined constant obtained by actually measuring the marker 100.

Figure 11:
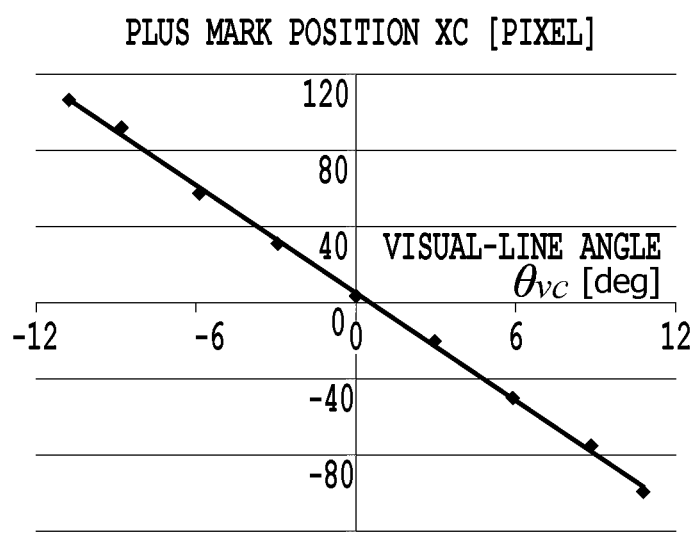
FIG. 11 is a graph illustrating one example of changes in position of the plus mark according to the visual-line angles in the pose detecting method in the preferred embodiment according to the present invention.

The equation (4) is assumed to be linear (FIG. 11 illustrates a relationship between $x_c$ and $\theta_{vc}$ when $\phi_{vc}$ is equal to zero). The position $(x_{c0}, y_{c0})$ on the two-dimensional plane of the center lens 113 needs to be already known during the use of the marker 100. This data may be added to the marker 100 when, for example, the marker 100 is inspected in a factory.

(D. Modifying Three-DOF Attitude Using Visual-Line Angle)

Out of the poses of the ArrayMark 100 of the six-DOF obtained above in A, the pose of the six-DOF of the ArrayMark 100 is obtained by modifying the attitude element of the three-DOF.

The modification is carried out according to the following equation (6).

$$H_{AM}=H_{CM}R_{mod}. \quad (6)$$

Here, $H_{AM}$ denotes a homogeneous transformation matrix (HTM) representing the pose of the six-DOF of the Array-Mark, and further, $H_{CM}$ denotes the HTM obtained in the above step A. Moreover, $R_{mod}$ is an HTM for modifying a rotation part of $H_{CM}$. Since $H_{CM}$ has been already calculated in the above step A, a key factor is how to calculate $R_{mod}$. The key factor will be described below.

Figure 12:
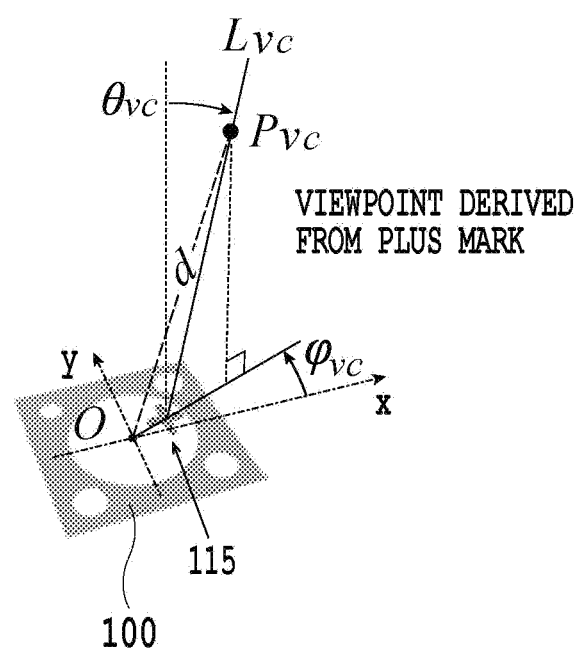
FIG. 12 is a diagram explanatory of a calculating method for a viewpoint at the position of the plus mark.
Figure 13:
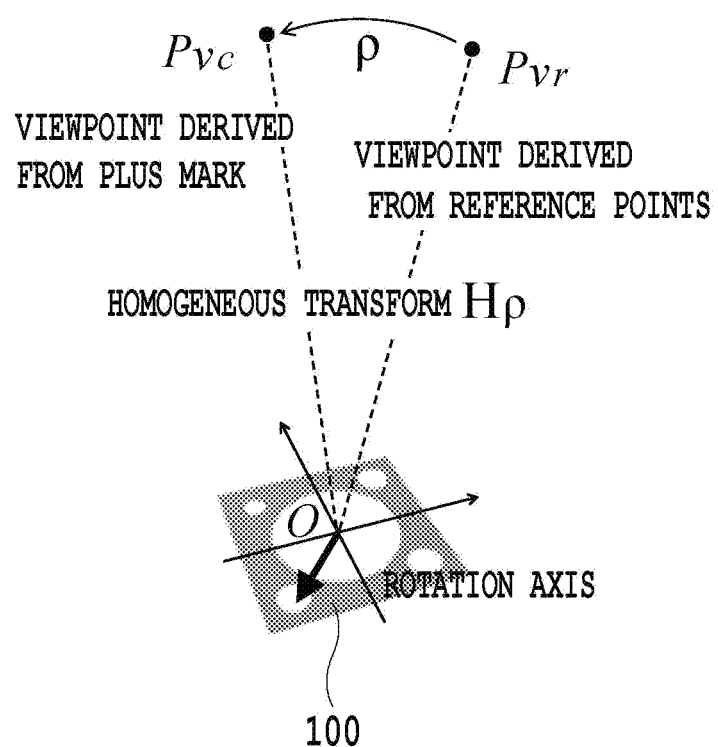
FIG. 13 is a diagram explanatory of a calculating method for pose correction in the pose detecting method in the preferred embodiment according to the present invention.

The concept of the pose correction is "to place back an ill-placed viewpoint (Pvr) to a well-placed viewpoint (Pvc)" (see FIGS. 12 and 13). Here, "the well-placed viewpoint" means a viewpoint obtained by measuring the plus mark 115.

1) Viewpoint Estimation Using Plus Mark (1) Calculating a visual line Lvc from $\theta_{vc}$ and $\phi_{vc}$; and (2) determining a viewpoint Pvc which is on Lvc, and whose distance from the origin of the marker 100 (i.e., the center of the lens area 110) is denoted by d, wherein the viewpoint Pvc is referred to as a well-placed viewpoint.

Here, d represents a distance from the origin of the marker 100 to the viewpoint Pvr derived from $H_{CM}$.

2) Calculating Pose Correction

The pose correction from Pvr to Pvc can be expressed as a rotation at an angle ρ on a rotational axis. A rotational-axis-vector a $(a_x, a_y, a_z)^T$ is calculated by the following equation (7).

$$a=\overrightarrow{OPv_r}\times\overrightarrow{OPv_c}, \quad (7)$$

where "O" is the origin of the ArrayMark 100 (i.e., the center of the lens area 110). Assuming that Hp represents the HTM expressing the rotation transformation, this is expressed by the following equation (8).

$$H_\rho = \begin{pmatrix} a_x^2 C + c & a_x a_y C + a_z s & a_x a_z C - a_y s & 0 \\ a_x a_y C - a_z s & a_y^2 C + c & a_y a_z C + a_x s & 0 \\ a_x a_z C + a_y s & a_y a_z C - a_x s & a_z^2 C + c & 0 \\ 0 & 0 & 0 & 1 \end{pmatrix}, \quad (8)$$

where c=cos ρ, s=sin ρ, and C=(1−cos ρ) (see Non-Patent Literature 5). $R_{mod}$ is calculated by the following equation (9).

$$R_{mod} = H_\rho^{-1}. \quad (9)$$

In this manner, the pose of the ArrayMark 100 can be calculated by using Equation (6). Here, Equation (6) is usable only when the plus mark 115 can be detected. Consequently, when the plus mark 115 cannot be detected, not $H_{AM}$ but $H_{CM}$ may express the pose of the six-DOF of the ArrayMark 100.

Figure 20:
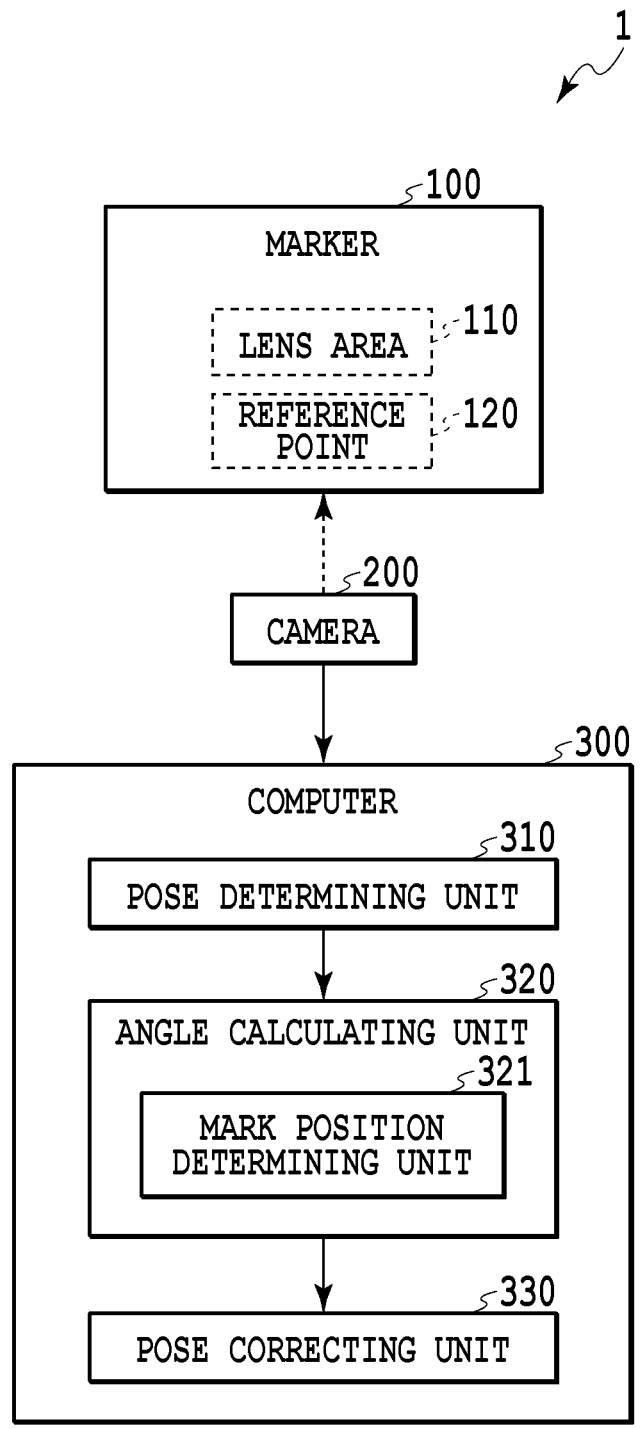
FIG. 20 is a block diagram illustrating one example of the configuration of the pose detecting system in the preferred embodiment according to the present invention.

FIG. 20 is a block diagram illustrating one example of the configuration of the pose detecting system in the present preferred embodiment. A pose detecting system 1 illustrated in FIG. 20 comprises a marker 100, a camera 200, and a computer 300.

The marker 100 includes the lens area 110 configured to produce a moiré pattern with the microlens array and a mark array having an array consisting of the plurality of marks (i.e., the plus signs 111) at a pitch similar to that between the plurality of lenses constituting the microlens array, and four reference points 120.

The camera 200 picks up the marker 100, and then, transmits an image including the picked-up marker 100 to the computer 300.

The computer 300 comprises a pose determining unit 310, an angle calculating unit 320, and a pose correcting unit 330.

The pose determining unit 310 determines the pose of the marker 100 based on the four reference points 120 included in the marker image. Specifically, the pose determining unit 310 performs the processing described above in A, for example.

The angle calculating unit 320 analyzes the moiré pattern, and then, calculates the visual-line angles $\theta_{vc}$ and $\phi_{vc}$ formed between the marker 100 and the straight visual-line Lvc connecting the center of the plus mark 115 having the shape similar to those of the plurality of plus signs 111 emerging at the lens area 110 by the moirépattern to the viewpoint of the marker 100. Specifically, the angle calculating unit 320 performs the processing described above in B and C, for example.

The pose correcting unit 330 corrects the pose of the marker 100 determined by the pose determining unit 310 by using the visual-line angle calculated by the angle calculating unit 320. Specifically, the pose correcting unit 330 performs the processing described above in D, for example.

In an alternative example, the pose determining unit 310 may enlarge an image region including the image of the marker 100 in the marker image, calculate the gravity of each of the four reference points 120, before resizing the image region including the image of the marker to an original size, and then, determine the gravity of the reference point 120 with a sub-pixel precision so as to detect the position of each of the four reference points 120 in the marker image, thus determining the pose of the marker 100 by the use of the position of each of the four reference points 120 in the detected marker image.

In another alternative example, the angle calculating unit 320 may include a mark position determining unit 321 for enlarging the image region including the image of the lens area 110 at the marker 100 in the marker image so as to calculate the position of the plus mark 115, before resizing the image region including the image of the lens area 110 to the original size, so as to determine the position of the plus mark 115 with a sub-pixel precision, and thus, may calculate the visual-line angle by using the position of the plus mark 115 determined by the mark position determining unit 321.

Figure 21:
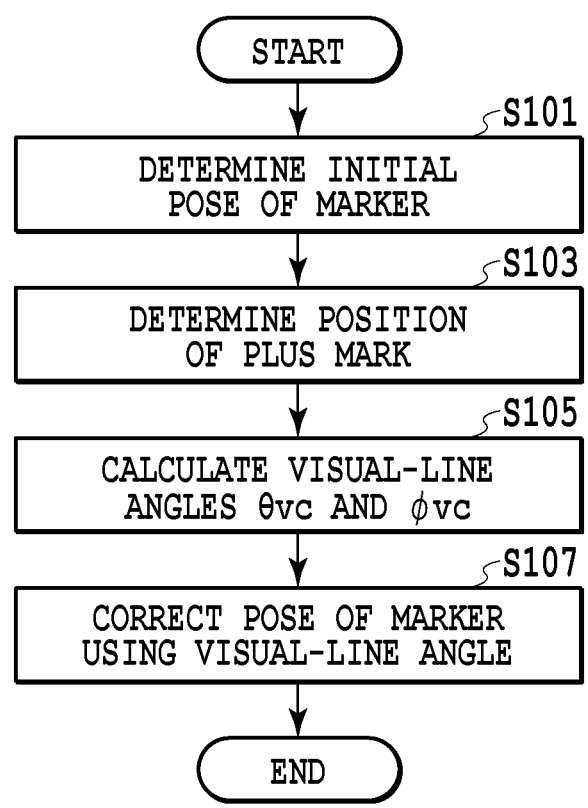
FIG. 21 is a flowchart illustrating one example of processing by the pose detecting system in the preferred embodiment according to the present invention.

FIG. 21 is a flowchart illustrating one example of processing by the pose detecting system in the present preferred embodiment.

The pose determining unit 310 determines the pose of the marker 100 based on the four reference points 120 included in the marker image including the image of the marker 100 picked up by the camera 200 (step S101).

The angle calculating unit 320 analyzes the moiré pattern, and then, calculates the position of the plus mark 115 that has the shape similar to that of each of the plurality of plus signs emerging at the lens area 110 as the moiré pattern (step S103). Moreover, the angle calculating unit 320 calculates the visual-line angles $\theta_{vc}$ and $\phi_{vc}$ formed between the marker 100 and the straight line (i.e., a visual line Lvc) connecting the center of the calculated plus mark 115 to the viewpoint of the marker 100 (step S105).

The pose correcting unit 330 corrects the initial pose of the marker 100 determined in step S101 by using the visual-line angle calculated in step S105 (step S107).

[Performance Verification of ArrayMark]

The performance of the pose detecting system in the present preferred embodiment is verified while being compared with the conventional technique.

(Measurement Environment)

Figure 14:
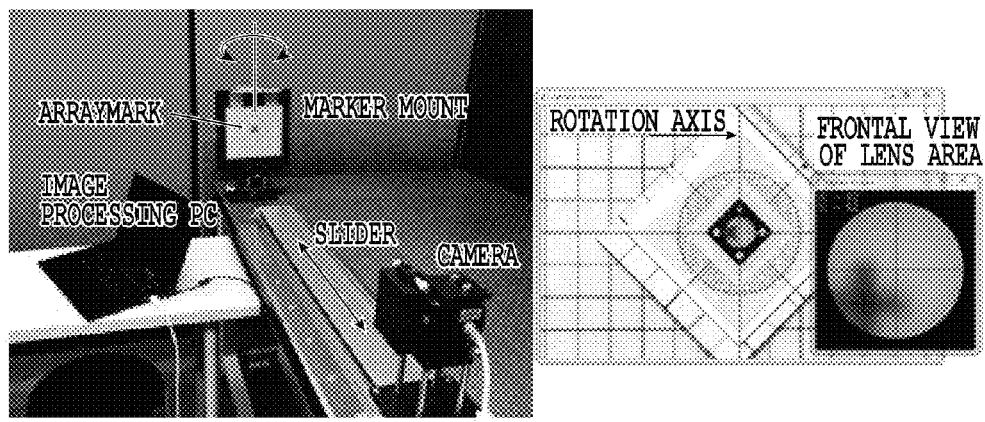
FIG. 14 is a view illustrating measurement environment in which performance is verified in the pose detecting system in the preferred embodiment according to the present invention.

FIG. 14 illustrates measurement environment in which the performance of the pose detecting system in the present preferred embodiment is verified. First, a sample of the ArrayMark is placed on a rotary table. The direction of a rotational axis is $(-110)^T$ in marker coordinates. A vision sensor is ARTCAM-036SS-BW (ARTRAY CO., LTD.), a USB2.0 CMOS camera. An image resolution is 752×480 [pixels]. All processing is performed by a laptop computer (CPU 64 bit, 2.8 GHz, RAM 8 GB). A processing program is written in a C/C++ language. An OpenCV2.3 library is used in image processing. The measurement is conducted in ordinary office-lighting environment.

(Results of Measurement)

Computational Speed

The pose estimation of one ArrayMark runs at a frequency of about 28 [Hz] using the above-described laptop computer.

Minimum Size on Image

A size of about 20 [pixels] or more of a marker on an image is required for stable marker recognition in the normal lighting environment.

Error in Pose Estimation

Figure 15:
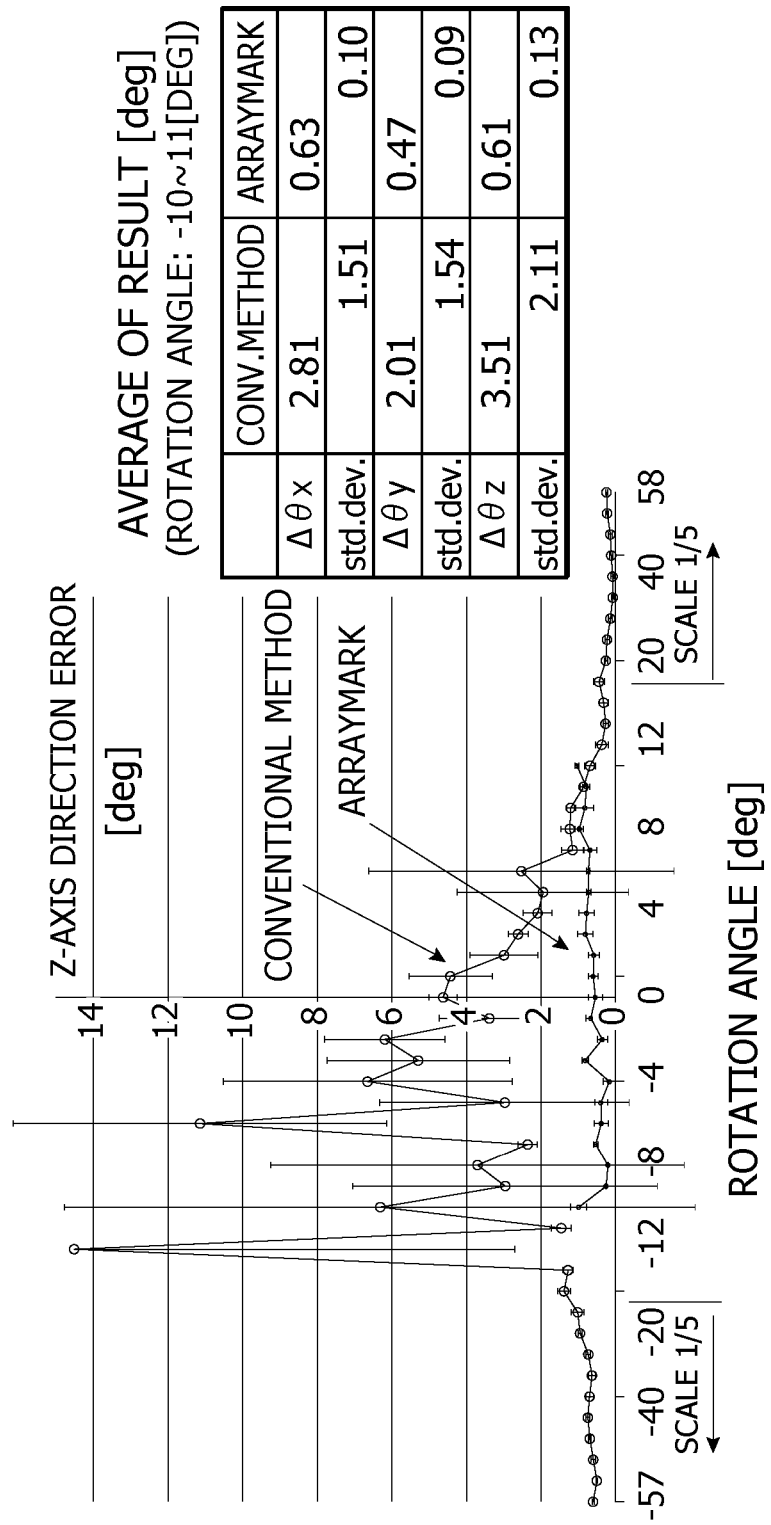

The ArrayMark is rotated every ±1 [deg] while the pose is estimated. The pose error is evaluated by an absolute angular difference between a real axial vector and an estimated axial vector in the marker coordinates. Their standard deviations are measured to be thus represented as error bars. The pose is estimated by the conventional technique at the same time for comparison. The size of the ArrayMark on the image is 92 [pixels] (see FIG. 15).

The results reveal that the pose estimation with a serious error by the conventional technique is very unstable when the pose is observed near the front: in contrast, the Array-Mark enables stable and accurate pose estimation.

Measurable Angular Range

When the visual-line angle exceeds a certain value, the plus mark 115 goes out of the lens area 110. In this measurement, the maximum value of the visual-line angle $\theta_{vc}$, at which the plus mark 115 can be detected, is about 10 [deg]. (Incidentally, this value of the visual-line angle is mere one example, and therefore, it depends upon the structure of the marker 100 and the like.) In view of this, the pose estimating techniques may be switched according to the visual-line angles, as follows: the method for detecting the pose of the ArrayMark in the preferred embodiment according to the present invention is used within a range in which the plus mark 115 can be detected whereas the pose detecting method in the related art is used in the other range.

Robustness to Distance

Variations of the accuracy of the pose estimation in the preferred embodiment according to the present invention are checked according to observation distances. The pose error is evaluated based on an angular error between a real value and an estimation value of a normal vector of the marker 100. FIG. 16 shows the results. The results reveal that the accuracy of the pose estimation in the preferred embodiment according to the present invention is not significantly degraded even if the observation distance becomes longer.

Robustness to Illumination Conditions

Figure 17:
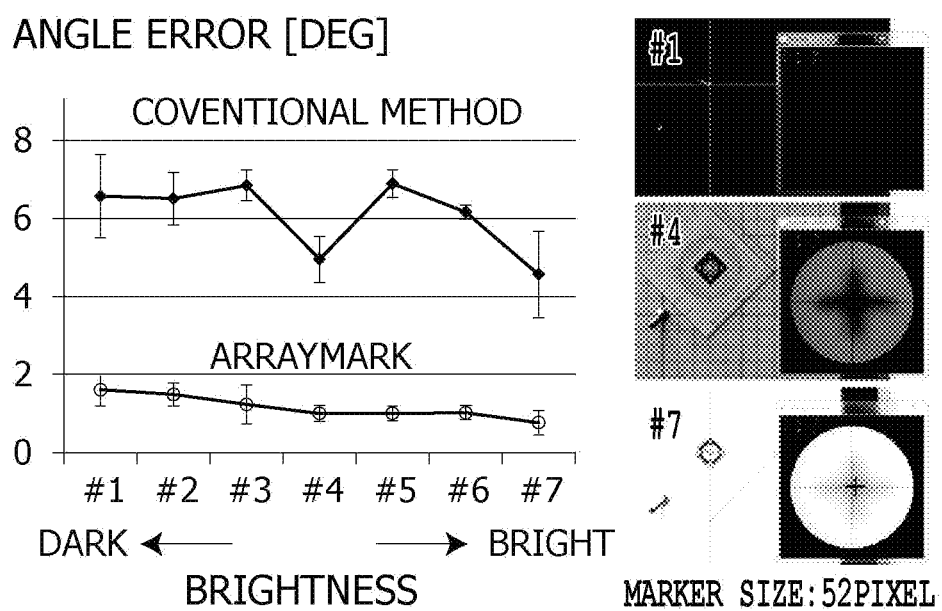

The variations of the accuracy of the pose estimation in the preferred embodiment according to the present invention is checked according to illumination intensity. The error is evaluated in the same manner as the robustness to the distance. FIG. 17 shows the results. The results reveal that the accuracy of the pose estimation in the preferred embodiment according to the present invention is not significantly degraded even if the illumination gets weaker.

Application Examples

Figure 18:
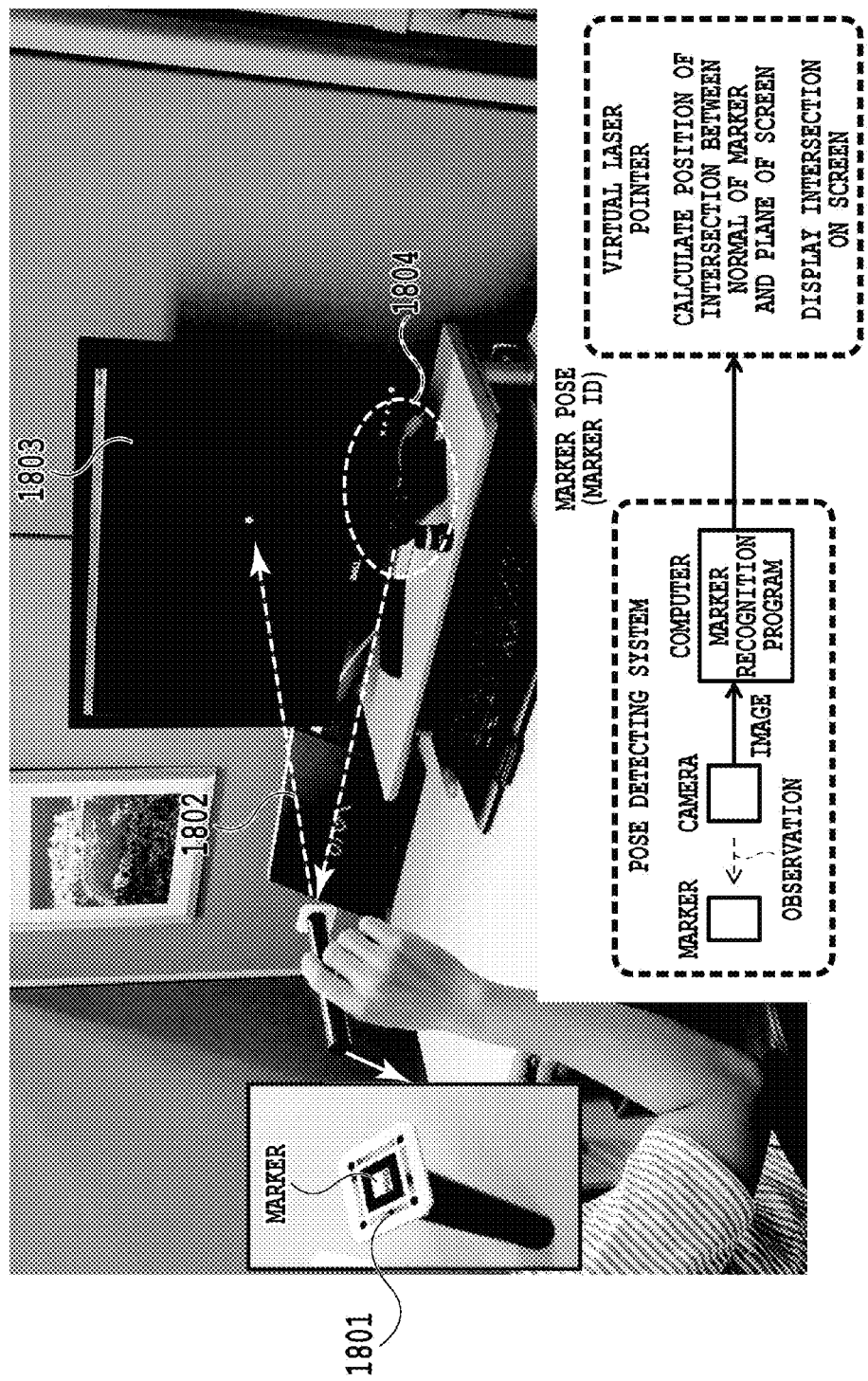
FIGS. 18 and 19 are diagrams specifically illustrating an application utilizing the pose detecting system in the preferred embodiment according to the present invention.
Figure 19:
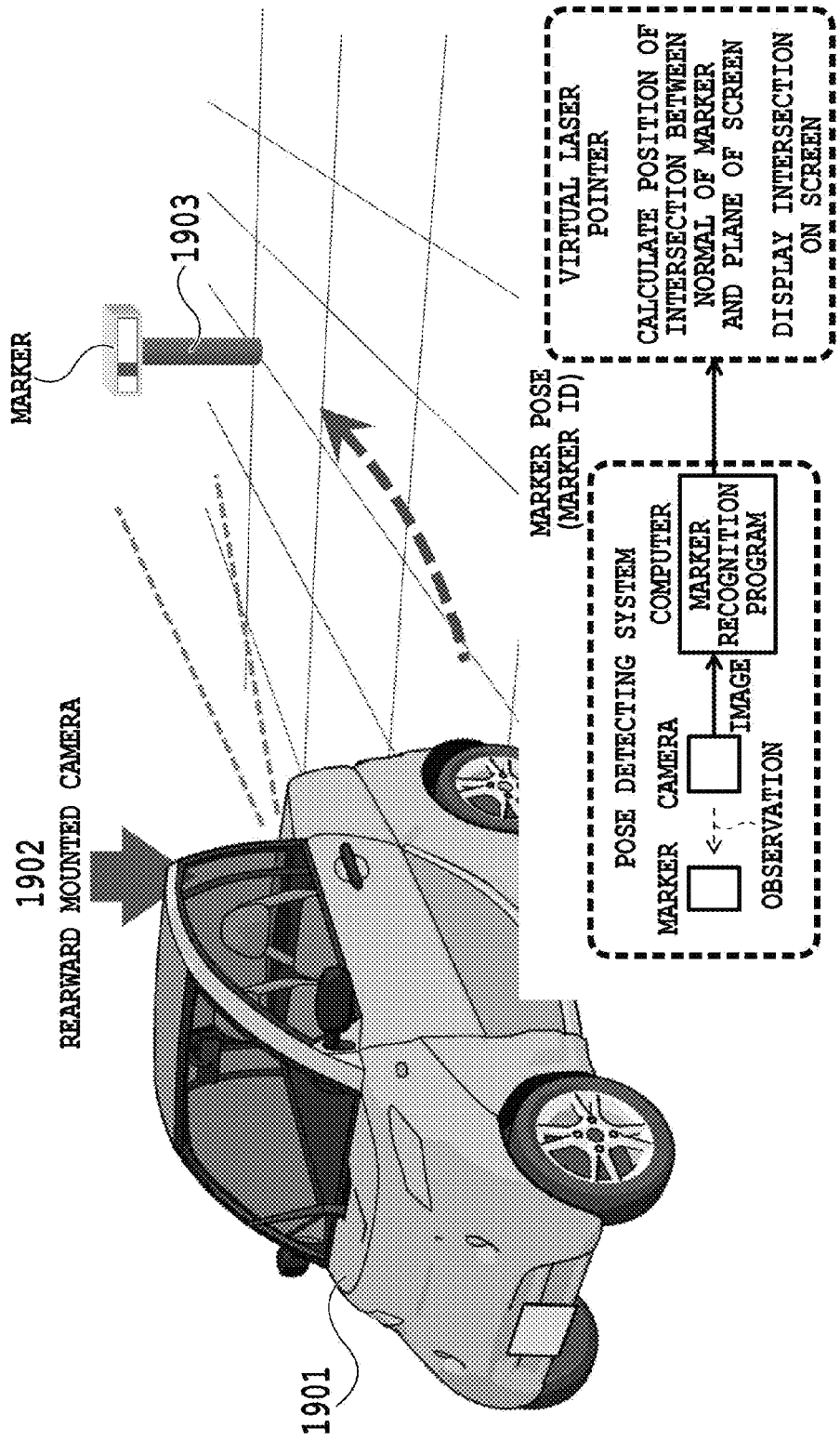

FIGS. 18 and 19 show specific examples of applications utilizing the pose detecting system in the present preferred embodiment.

FIG. 18 shows an example of a virtual laser pointer. When the positional relationship between a camera 1804 and a screen 1803 has been known, it is possible to calculate where a virtual laser beam represented by a broken line 1802 going from a marker attached to a pointer 1801 to be operated by a user's hand in a normal direction is incident into the screen 1803. Since the pose detection of the marker in the prior art is inaccurate, a virtual beam displayed on the screen 1803 is largely deviated. However, the pointer can be stably displayed by the marker pose detecting method in the present preferred embodiment.

Moreover, FIG. 19 illustrates an example of automatic parking control. A marker post 1903 with a marker, installed near a parking position is observed by a camera 1902 mounted on a mobile body 1901 such as an automobile or a mobile robot. In this manner, the pose of the mobile body 1901 such as an automobile can be accurately detected, so that the mobile body 1901 can be automatically parked in a parking lot or a garage.

The pose of the detected marker is output from the pose detecting system to outside electronic equipment or the like with an ID for identifying a marker (as required) via communications or the like. As illustrated in FIGS. 18 and 19, the outside electronic equipment or the like can utilize the pose of the marker received from the pose detecting system as various kinds of applications.

Figure 22:
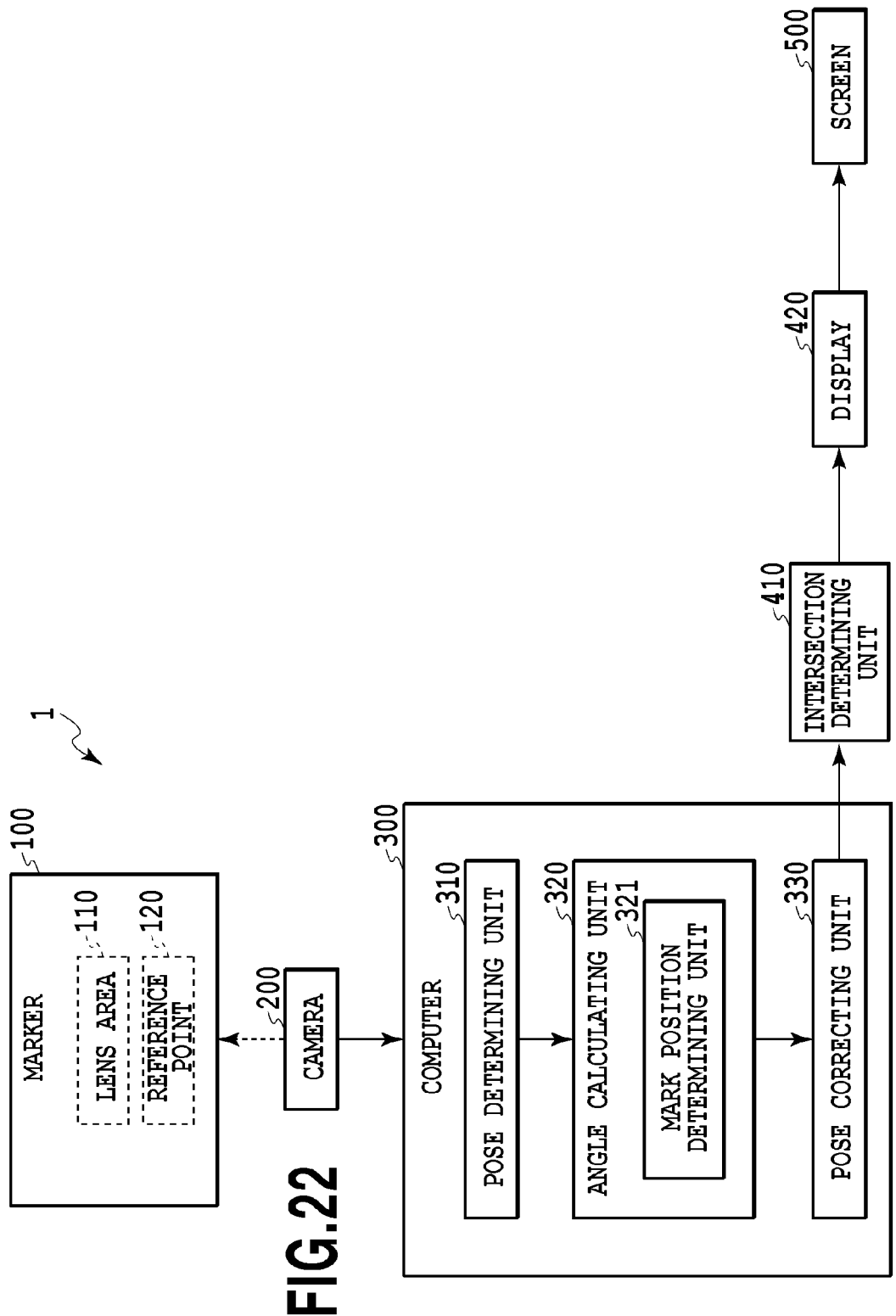
FIG. 22 is a block diagram illustrating one example of the configuration of the application utilizing the pose detecting system in the preferred embodiment according to the present invention.

FIG. 22 is a diagram illustrating one example of the configuration of an application utilizing the pose detecting system in the preferred embodiment according to the present invention. FIG. 22 illustrates the configuration of the virtual laser pointer illustrated in FIG. 18 by way of an example. The pose detecting system illustrated in FIG. 22 comprises a marker 100, a camera 200, a computer 300, an intersection determining unit 410, a display 420, and a screen 500.

Here, the configurations of the marker 100, the camera 200, and the computer 300 are the same as those in the pose detecting system illustrated in FIG. 20.

The intersection determining unit 410 determines the intersection of the normal of the marker 100 with the screen 500 based on the pose of the marker 100 corrected by the pose correcting unit 330.

The display 420 displays, on the screen 500, the intersection determined by the intersection determining unit 410.

Figure 23:
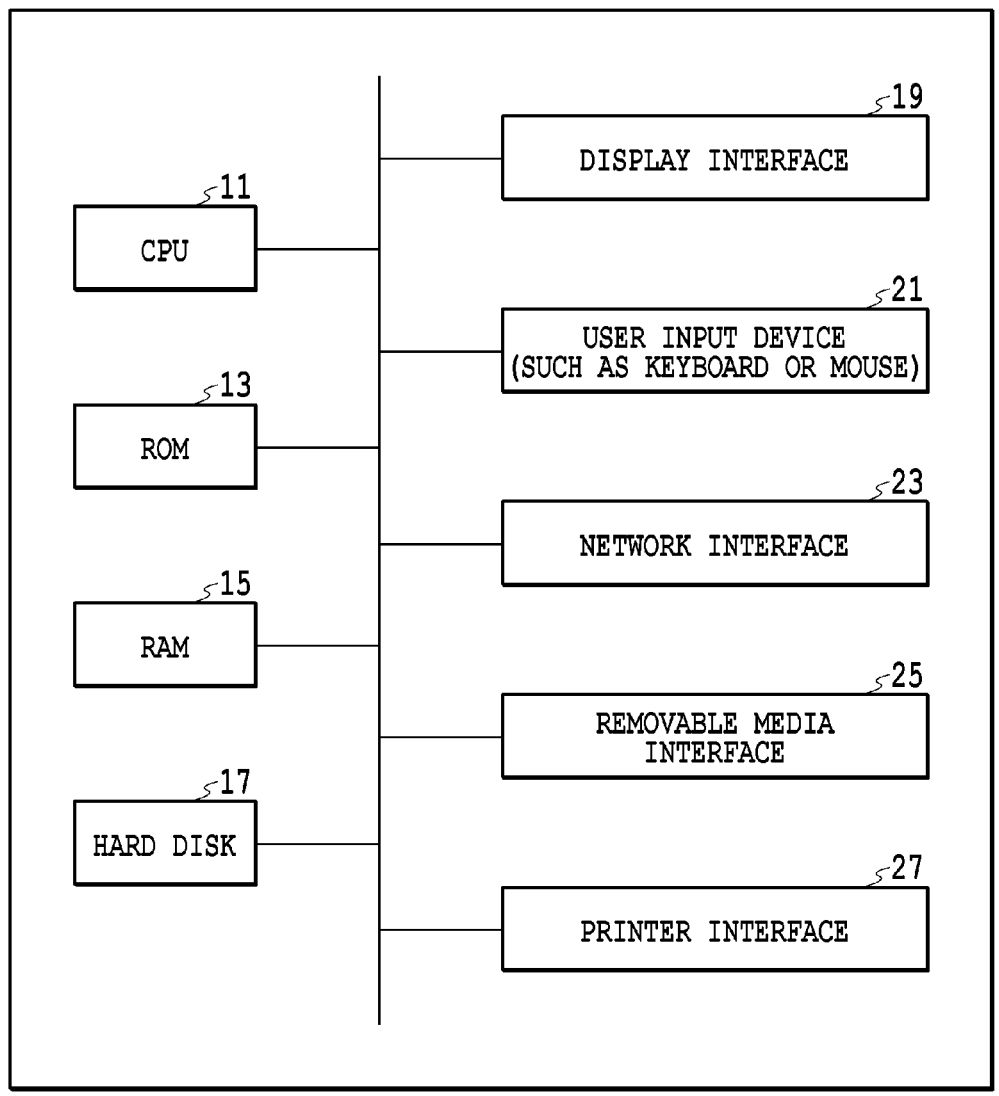
FIG. 23 is a block diagram illustrating one example of a hardware configuration of each of devices included in the pose detecting system in the preferred embodiment according to the present invention.

FIG. 23 illustrates one example of hardware arrangement of each of the devices included in the pose detecting system in the preferred embodiment according to the present invention.

As illustrated in FIG. 23, the devices included in the pose detecting system can be achieved by a configuration similar to that of a general computer apparatus comprising: a CPU (abbreviating Central Processing Unit) 11; storage devices such as a ROM 13, a RAM 15, and a hard disk 17; a display interface 19 to be connected to a display; a user input device 21 for use in an input operation by a user such as a keyboard or a mouse; a network interface 23 to be connected to a network; a removable media interface 25 to be connected to a removable media; and a printer interface 27 to be connected to a printer. Each of the devices stores a marker recognition program for executing the above-described processing in the storage device such as the hard disk 17. The CPU 11 reads the program stored in the hard disk 17 or the like, and then, executes it, thus implementing the above-described processing. Additionally, various kinds of data for use in the processing can be stored in the hard disk 17, the RAM 15, and the like in the devices at any time.

As described above, the pose detecting system in the present preferred embodiment can provide the AR marker (i.e., the ArrayMark) whose pose can be stably estimated with high accuracy even at the time of the observation of the marker near the front and an image processing algorism for the pose estimation based on the new principle completely different from that of the prior art. In addition, the AR marker in the present preferred embodiment is very useful for an application requiring more accurate CG superimposition displaying than that in the prior art.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A pose detecting system comprising:
   a marker that uses a microlens array;
   a camera that picks up the marker; and
   a computer that receives a marker image including an image of the marker picked up by the camera, wherein the marker includes:
   a lens area constituted of the microlens array and a mark array having a plurality of marks arrayed with a pitch similar to that between a plurality of lenses constituting the microlens array in such a manner as to produce a moiré pattern (an interference pattern); and
   four reference points, and wherein the computer is configured to perform actions, the actions including:

determining a pose of the marker based on the four reference points;

analyzing the moiré pattern so as to calculate an angle formed by the marker and a straight line connecting a center of an integrated mark that emerges at the lens area as the moiré pattern and is similar in shape to each of the plurality of marks to a viewpoint at the marker, the analyzing includes subjecting, to conversion, a position of the integrated mark on a two-dimensional plane, on which the plurality of marks are arrayed, based on a predetermined linear conversion formula so as to calculate the angle; and correcting the determined pose of the marker by using the calculated angle, including calculating a rotational matrix such that a point Pvr calculated based on the pose of the marker is regarded as a point Pvc that is on a straight line connecting the center of the integrated mark to the viewpoint of the marker and a distance from a center of the lens area is equal to a distance between the center of the lens area and the point Pvr, and then, multiplies a matrix indicating the pose of the marker by a matrix inverse to the rotational matrix, so as to correct the pose of the marker.

2. The pose detecting system according to claim 1, wherein the determining of the pose of the marker includes:

magnifying an image region including the image of the marker in the marker image so as to calculate gravities of the four reference points, before resizing the image region including the image of the marker to its original size so as to determine the gravities of the four reference points with sub-pixel accuracy, thus detecting the positions of the four reference points on the marker image; and determining the pose of the marker by using the positions of the four reference points on the detected marker image.

3. The pose detecting system according to claim 1, wherein the marker is formed into a square shape, and wherein the calculating of the angle includes converting the image of the marker such that the four reference points are located at four corners of a square, and further, has a same outside appearance as that observed in a direction opposite to the marker.

4. The pose detecting system according to claim 1, wherein the calculating of the angle includes:

magnifying an image region including an image of the lens area of the marker on the marker image so as to calculate the position of the integrated mark, before resizing the image region including the image of the lens area to its original size, thus determining the position of the integrated mark with sub-pixel accuracy, and calculating the angle by using the determined position of the integrated mark.

5. The pose detecting system according to claim 4, wherein the determining of the position of the integrated mark with sub-pixel accuracy includes regarding a gravity of the region having a maximum area of a black portion of an image obtained by segmenting the image of the lens area into connected regions by binarization as the position of the integrated mark.

6. The pose detecting system according to claim 4, wherein the integrated mark is formed into a cross shape, and wherein the determining of the position of the integrated mark with sub-pixel accuracy includes scanning the image of the lens area by using a set of sampling points arranged in a cross shape, a center of the set of sampling points having a maximum or minimum sum of measurement values of the sampling points being regarded as the position of the integrated mark.

7. The pose detecting system according to claim 1, further comprising:

a screen that is pointed to by a pointer with the marker, wherein the computer is further configured to determine an intersection between the normal of the marker and the screen based on the corrected pose of the marker; and a display for use in displaying the intersection on the screen.

8. A method to be implemented by a pose detecting system that has a marker including a lens area constituted of a microlens array and a mark array having a plurality of marks arrayed with a pitch similar to that between a plurality of lenses constituting the microlens array in such a manner as to produce a moiré pattern (an interference pattern) and four reference points; a camera picking up the marker; and a computer receiving a marker image including an image of the marker picked up by the camera, the method comprising:

determining, by the computer, a pose of the marker based on the four reference points;

analyzing, by the computer, the moiré pattern so as to calculate an angle formed by the marker and a straight line connecting a center of an integrated mark that emerges at the lens area as the moiré pattern and is similar in shape to each of the plurality of marks to a viewpoint at the marker, the analyzing includes subjecting, to conversion, a position of the integrated mark on a two-dimensional plane, on which the plurality of marks are arrayed, based on a predetermined linear conversion formula so as to calculate the angle; and correcting, by the computer, the determined pose of the marker with the calculated angle by calculating a rotational matrix such that a point Pvr calculated based on the pose of the marker is regarded as a point Pvc that is on a straight line connecting the center of the integrated mark to the viewpoint of the marker and a distance from a center of the lens area is equal to a distance between the center of the lens area and the point Pvr, and then, multiplies a matrix indicating the pose of the marker by a matrix inverse to the rotational matrix, so as to correct the pose of the marker.

9. A method to be implemented by a pointer system that has a pointer with a marker including a lens area constituted of a microlens array and a mark array having a plurality of marks arrayed with a pitch similar to that between a plurality of lenses constituting the microlens array in such a manner as to produce a moiré pattern (an interference pattern) and four reference points; a camera picking up the marker; one or more computers receiving a marker image including an image of the marker picked up by the camera; and a screen pointed by the pointer, the method comprising:

determining, by the one or more computers, a pose of the marker based on the four reference points;

analyzing, by the one or more computers, the moiré pattern so as to calculate an angle formed by the marker and a straight line connecting a center of an integrated mark that emerges at the lens area as the moiré pattern and is similar in shape to each of the plurality of marks to a viewpoint at the marker, the analyzing includes subjecting, to conversion, a position of the integrated mark on a two-dimensional plane, on which the plurality of marks are arrayed, based on a predetermined linear conversion formula so as to calculate the angle;

correcting, by the one or more computers, the determined pose of the marker with the calculated angle by calculating a rotational matrix such that a point Pvr calculated based on the pose of the marker is regarded as a point Pvc that is on a straight line connecting the center of the integrated mark to the viewpoint of the marker and a distance from a center of the lens area is equal to a distance between the center of the lens area and the point Pvr, and then, multiplies a matrix indicating the pose of the marker by a matrix inverse to the rotational matrix, so as to correct the pose of the marker;

determining, by the one or more computers, an intersection between a normal of the marker and the screen based on the corrected pose of the marker; and displaying, by the one or more computers, the intersection on the screen.

10. A computer-readable non-transitory storage medium storing therein a program enabling a computer system to execute pose detecting processing, wherein the computer system has a marker including a lens area constituted of a microlens array and a mark array having a plurality of marks arrayed with a pitch similar to that between a plurality of lenses constituting the microlens array in such a manner as to produce a moiré pattern (an interference pattern), and four reference points; a camera picking up the marker; and a computer receiving a marker image including an image of the marker picked up by the camera, the program enabling the computer to:

determine a pose of the marker based on the four reference points;

analyze the moiré pattern so as to calculate an angle formed by the marker and a straight line connecting a center of an integrated mark that emerges at the lens area as the moiré pattern and is similar in shape to each of the plurality of marks to a viewpoint at the marker, the analyzing includes subjecting, to conversion, a position of the integrated mark on a two-dimensional plane, on which the plurality of marks are arrayed, based on a predetermined linear conversion formula so as to calculate the angle; and correct the determined pose of the marker with the calculated angle by calculating a rotational matrix such that a point Pvr calculated based on the pose of the marker is regarded as a point Pvc that is on a straight line connecting the center of the integrated mark to the viewpoint of the marker and a distance from a center of the lens area is equal to a distance between the center of the lens area and the point Pvr, and then, multiplies a matrix indicating the pose of the marker by a matrix inverse to the rotational matrix, so as to correct the pose of the marker.

11. A computer-readable non-transitory storage medium storing therein a program enabling a computer system to execute virtual laser pointing processing, wherein the computer system has a pointer with a marker including a lens area constituted of a microlens array and a mark array having a plurality of marks arrayed with a pitch similar to that between a plurality of lenses constituting the microlens array in such a manner as to produce a moiré pattern (an interference pattern), and four reference points; a camera picking up the marker; one or more computers receiving a marker image including an image of the marker picked up by the camera; and a screen pointed by the pointer, the program enabling the one or more computers to:

determine a pose of the marker based on the four reference points;

analyze the moiré pattern so as to calculate an angle formed by the marker and a straight line connecting a center of an integrated mark that emerges at the lens area as the moiré pattern and is similar in shape to each of the plurality of marks to a viewpoint at the marker, the analyzing includes subjecting, to conversion, a position of the integrated mark on a two-dimensional plane, on which the plurality of marks are arrayed, based on a predetermined linear conversion formula so as to calculate the angle;

correct the determined pose of the marker with the calculated angle by calculating a rotational matrix such that a point Pvr calculated based on the pose of the marker is regarded as a point Pvc that is on a straight line connecting the center of the integrated mark to the viewpoint of the marker and a distance from a center of the lens area is equal to a distance between the center of the lens area and the point Pvr, and then, multiplies a matrix indicating the pose of the marker by a matrix inverse to the rotational matrix, so as to correct the pose of the marker;

determine an intersection between a normal of the marker and the screen based on the corrected pose of the marker; and display the intersection on the screen.

* * * * *